UNITED STATES PATENT OFFICE.

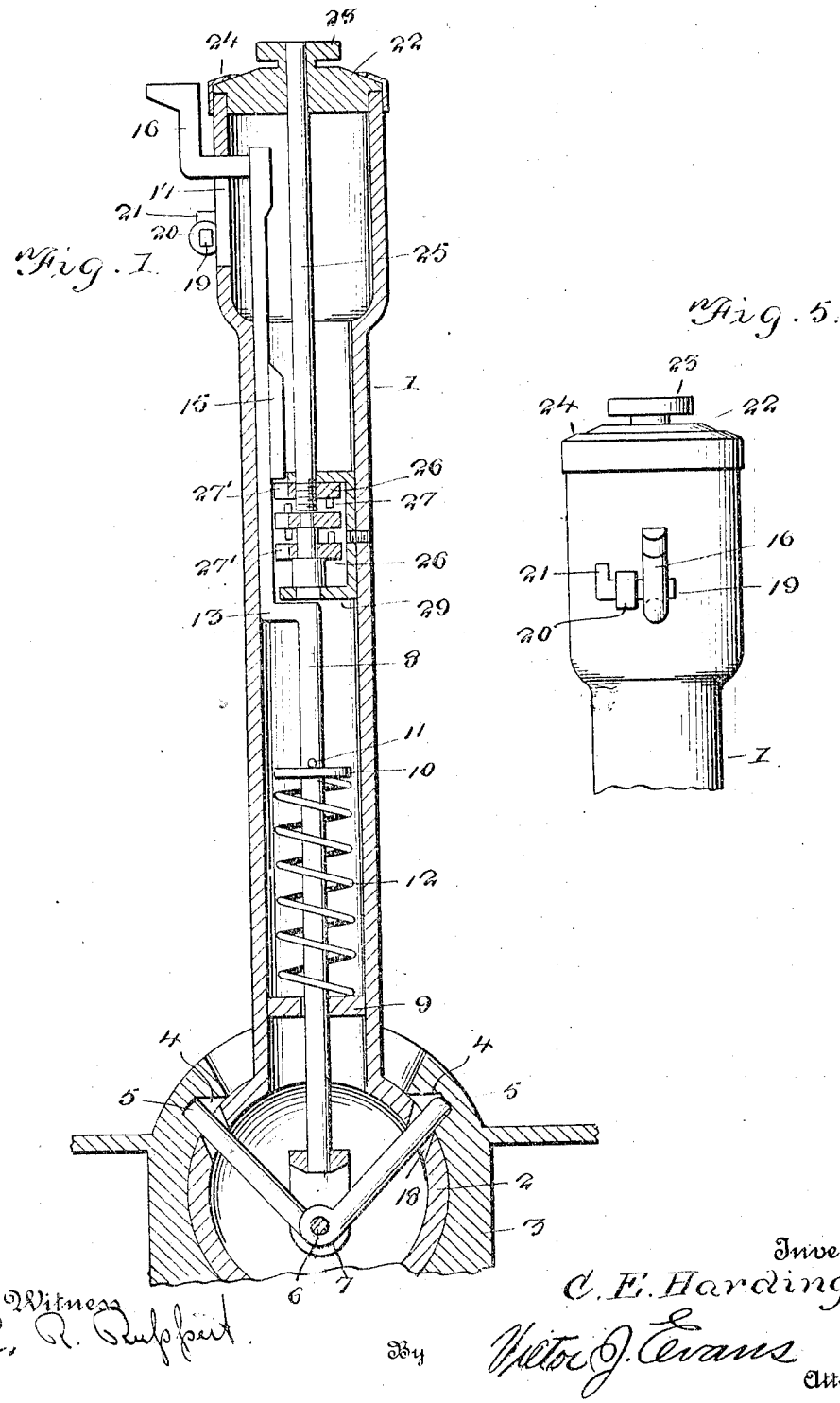

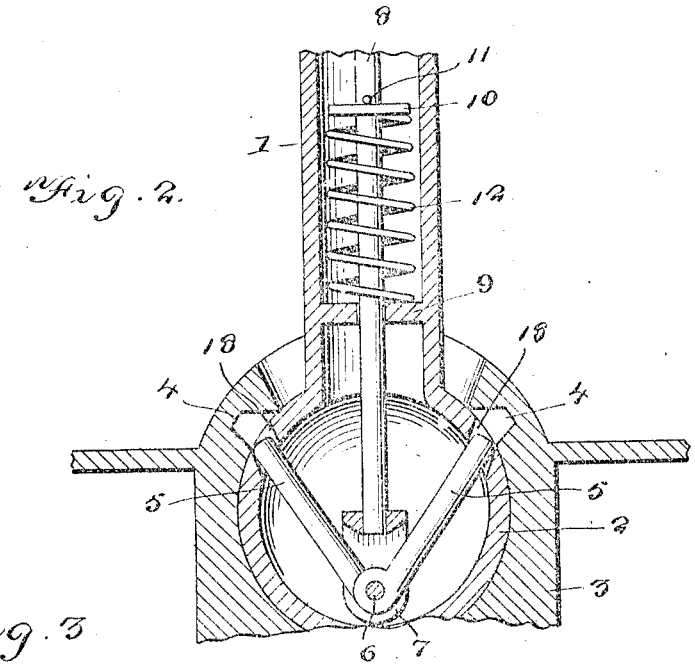
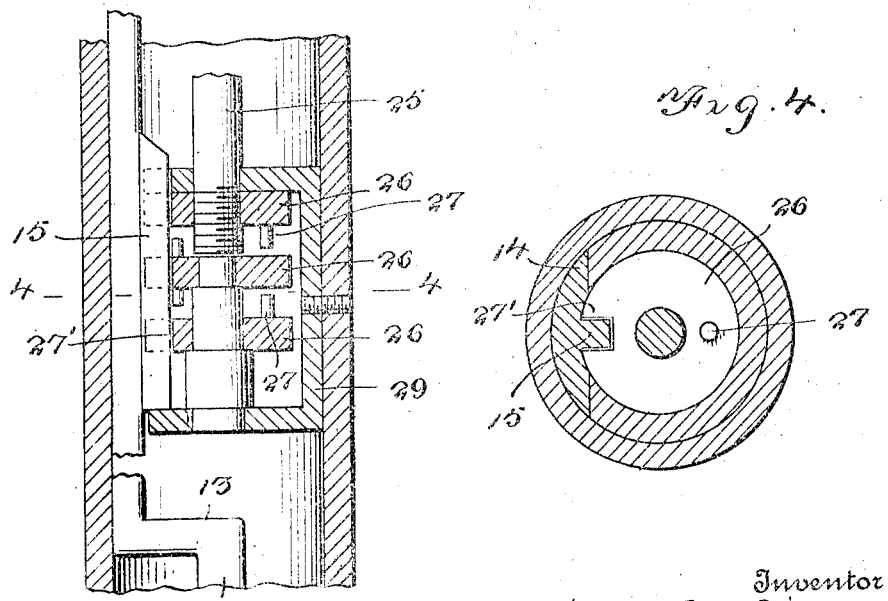

CHARLES E. HARDING, OF SIOUX FALLS, SOUTH DAKOTA, ASSIGNOR OF ONE-THIRD TO HELEN B. LANE, OF SIOUX FALLS, SOUTH DAKOTA.

TRANSMISSION-GEAR LOCK.

1,312,728.  Specification of Letters Patent.  Patented Aug. 12, 1919.

Application filed December 30, 1918. Serial No. 268,838.

*To all whom it may concern:*

Be it known that I, CHARLES E. HARDING, a citizen of the United States, residing at Sioux Falls, in the county of Minnehaha and State of South Dakota, have invented new and useful Improvements in Transmission-Gear Locks, of which the following is a specification.

This invention relates to transmission gear locks, the objects in view being to provide simple and for the greater part concealing means for securely locking the gear shifting lever of a motor vehicle, thereby preventing the unauthorized use and operation of such vehicle.

With the above and other objects in view, the invention consists in the construction, combination and arrangement of parts, as herein described, illustrated and claimed.

In the accompanying drawings:

Figure 1 is a longitudinal section through a gear shifting lever, showing the locking means therefor in locking position.

Fig. 2 is a fragmentary view of the same showing the locking pins in unlocking position.

Fig. 3 is an enlarged fragmentary longitudinal sectional view through the tumbler mechanism of the lock.

Fig. 4 is a transverse section through the same on the line 4—4 of Fig. 3.

Fig. 5 is a fragmentary elevation showing the means for holding the locking mechanism out of use as when operating a vehicle.

In carrying out the present invention, I employ a tubular gear shifting lever 1 having an inlet hollow spherical portion 2 which is received in a socket member 3 of corresponding shape, said socket member, for the purpose of the present invention, being formed at diametrically opposite places with locking pin notches 4 adapted to receive the outer extremities of a pair of locking pins 5 which are connected by means of a pivot 6 to a clip 7, fast on the lower end of a locking rod 8, the lower portion of the latter passing centrally and longitudinally through the tubular lever 1 as shown in Fig. 1. The rod 8 passes through a stationary guide 9 in the lower part of the lever 1 and is surrounded by a disk like spring seat or stop 10, held in place on the rod 8 by means of a pin 11 or the equivalent thereof. Interposed between the stop 10 and the guide 9 is a coil compression spring 12, the tension of which is exerted to force locking pins 5 into engagement with the notches 4, as shown in Fig. 1.

At a suitable point in the length of the lever 1, the rod 8 is offset as shown at 13 and extending upwardly from said offset 13 is a laterally expanded portion 14 of segmental shape in cross section as shown in Fig. 4 and having on the concaved or inner side thereof a projecting rib 15, the purpose of which will presently appear. The upper portion of the locking rod 8 extends to a point near the upper end of the lever 1 where it is provided with an operating arm 16 extending through a longitudinal slot 17 in the side of the lever 1, the arm 16 being used for depressing the locking rod 8 to move the locking pins 5 out of engagement with the notches 4. The pins 5 are slidable through guide openings 18 in the spherical portions 2 of the lever 1. The locking rod 8 may be held and maintained in its depressed or unlocking position by means of a bolt 19 slidable in a guide 20 on one side of the lever 1, the bolt 19 being provided with an operating knob or head 21. By sliding the bolt 19 over the operating arm 16 when the latter is fully depressed, the locking rod 8 is held depressed, thereby preventing the locking pins 5 from engaging the notches 4.

Inserted in the upper end of the lever 1 is a rotatable graduated dial 22 having an operating knob 23 and held in place by an annular retainer 24. Extending downwardly from the dial 22 is a tumbler operating rod 25 having secured to the lower end thereof the upper one of a series of disk shaped tumblers 26, said tumblers being provided with pins 27, for the purpose of positioning the tumblers in proper relation to each other, and each tumbler being formed with a notch 27′ adapted to receive the rib 15 on the locking rod 8 hereinabove referred to.

From the foregoing description, taken in connection with the accompanying drawings, it will now be understod that in order to operate the machine, with the parts locked as shown in Fig. 1, it is necessary to properly manipulate the tumblers 26 before the locking rod 8 can be depressed for moving the locking pins 5 out of engagement with the notches 4. This requires a knowledge of the combination and would require considerable time on the part of an unauthorized person unfamiliar with the combination to manipulate the locking mechanism even were he acquainted with the nature of the remainder of the mechanism. The dial 22 is located in a conspicuous place and where it would require an unauthorized person to occupy a very prominent position, all of which would tend to defeat the unauthorized starting and operation of the vehicle. The tumblers 20 are mounted within a casing 29, one side of which is cut away to receive the segmental portion 14 of the locking rod 8.

I claim:

1. The combination of a tubular gear shifting lever, a bearing socket member for said lever having a locking notch, a longitudinally shiftable locking rod extending lengthwise of and within said lever, a locking pin pivotally attached to said rod and movable through a guideway in said lever into and out of said notch, a spring acting on said rod to thrust the latter in a direction which will force the locking pin into said notch, and manually operable means for locking said rod in such position.

2. The combination of a tubular gear shifting lever, a bearing socket member for said lever having a locking notch, a longitudinally shiftable locking rod extending lengthwise of and within said lever, a locking pin pivotally attached to said rod and movable through a guideway in said lever into and out of said notch, a spring acting on said rod to thrust the latter in a direction which will force the locking pin into said notch, a rib extending longitudinally of said locking rod, a plurality of disk-shaped locking tumblers each having a notch to receive said rib, and manually operable means for shifting said tumblers.

3. The combination of a tubular gear shifting lever, a bearing socket member for said lever having a locking notch, a longitudinally shiftable locking rod extending lengthwise of and within said lever, a locking pin pivotally attached to said rod and movable through a guideway in said lever into and out of said notch, a spring acting on said rod to thrust the latter in a direction which will force the locking pin into said notch, and means for holding said locking rod against the tension of said spring in non-locking position.

In testimony whereof I affix my signature.

CHARLES E. HARDING.